US008763282B2

(12) United States Patent
Brufau Guinovart et al.

(10) Patent No.: US 8,763,282 B2
(45) Date of Patent: Jul. 1, 2014

(54) WEARING ELEMENT WITH ENHANCED WEAR RESISTANCE

(75) Inventors: Jordi Brufau Guinovart, Vallromanes (ES); Jorge Alcala, Barcelona (ES); Jorge Triginer Boixeda, Barcelona (ES); Jose Sanchez, Premia de Dalt (ES); Jose Lopez Almendros, Barcelona (ES)

(73) Assignee: Metalogenia, S.A., Premia de Mar (ES)

( * ) Notice: Subject to any disclaimer, the term of this patent is extended or adjusted under 35 U.S.C. 154(b) by 246 days.

(21) Appl. No.: 13/322,881

(22) PCT Filed: May 28, 2010

(86) PCT No.: PCT/EP2010/003246
§ 371 (c)(1),
(2), (4) Date: Feb. 15, 2012

(87) PCT Pub. No.: WO2010/136208
PCT Pub. Date: Dec. 2, 2010

(65) Prior Publication Data
US 2012/0131821 A1    May 31, 2012

Related U.S. Application Data

(60) Provisional application No. 61/213,321, filed on May 29, 2009.

(30) Foreign Application Priority Data

Jul. 1, 2009  (WO) ................. PCT/ES2009/000352
Aug. 10, 2009  (WO) ................. PCT/EP2009/005802

(51) Int. Cl.
*E02F 3/00*  (2006.01)
(52) U.S. Cl.
USPC ............................................. 37/460
(58) Field of Classification Search
USPC ......... 37/452–460; 172/701.1–701.3; 29/105, 29/527.5, 530; 428/614
See application file for complete search history.

(56) References Cited

U.S. PATENT DOCUMENTS

| 4,547,468 A | 10/1985 | Jones et al. |
| 4,909,300 A | 3/1990 | Horie |
| 5,081,774 A | 1/1992 | Kuwano |
| 2002/0136857 A1 | 9/2002 | Francois |
| 2003/0213861 A1 | 11/2003 | Condon et al. |
| 2007/0128462 A1 | 6/2007 | Andreussi et al. |
| 2008/0314646 A1 | 12/2008 | Lockwood et al. |

FOREIGN PATENT DOCUMENTS

| GB | 2 254 814 A | 10/1992 |
| WO | WO 2005/018854 A1 | 3/2005 |

*Primary Examiner* — Robert Pezzuto
(74) *Attorney, Agent, or Firm* — Sughrue Mion, PLLC

(57) ABSTRACT

Wearing element with enhanced wear resistance related to wearing elements, such as cast steel teeth to be specially used in machinery for earth-moving, ground-engaging and/or rock-loading applications, as well as to inserts to be included within the wearing elements, to enhance their wear resistance thus prolonging their service life.

20 Claims, 3 Drawing Sheets

WEARING ELEMENT WITH ENHANCED WEAR RESISTANCE

CROSS REFERENCE TO RELATED APPLICATIONS

This application is a National Stage of International Application No. PCT/EP2010/003246 filed May 28, 2010, claiming priority based on U.S. Provisional Application No. 61/213,321 filed May 29, 2009, PCT/ES2009/000352 filed Jul. 1, 2009, PCT/EP2009/005802 filed Aug. 10, 2009, the contents of all of which are incorporated herein by reference in their entirety.

FIELD OF THE INVENTION

The present invention relates to wearing elements, such as cast steel teeth to be specially used in machinery for earth-moving, ground-engaging and/or rock-loading applications, as well as to inserts to be included within the wearing elements to enhance their wear resistance thus prolonging/extending their service life.

BACKGROUND OF THE INVENTION

Prior Art

The insertion-casting of hard bodies into cast steel wearing elements for ground-engaging applications to enhance their wear resistance has been previously described in the state-of-the-art.

For instance, in document U.S. Pat. No. 5,081,774 (Kuwano), a replaceable composite excavating tooth that comprises wear-resistant Cr-cast iron inserts having a higher hardness than a tooth body and being insert-cast into the tooth body is disclosed. The performance of the excavating tooth is improved by locating the wear-resistant material as an integral insert at a central part of the tooth body. The insert extends from the tip end towards an attachment part of the tooth and terminates at a limiting position for the potential use of the teeth. Although Cr-cast iron is a material that is somewhat similar to cast steel and therefore seemingly compatible as an insert in cast steel, it is desirable to increase the hardness of the insert above that of Cr-cast iron with the purpose of enhancing the overall wear behavior of the part, while at the same time preserving the toughness of cast steel in the insert.

Attention has also been given in the state-of-the-art to the use of other high hardness materials to reinforce iron-based castings. In this art, the inserts of choice are generally constituted by cermet materials such as WC particles cemented with a metallic binder. The benefit provided by these inserts is the potential good bonding developed with the poured steel because of the similar metallic nature between the binder and the steel. However, in the field of ground-engaging wearing elements, insert-casting of cermet-based reinforcing bodies is limited to demanding applications with a high downtime cost. This is mainly due to the high economic value of the cermet material. The development of hard wear resistant reinforced elements with a lower cost is therefore desirable.

In a more general context, it is well known that lower-cost ceramic materials can be infiltrated by molten metals. For instance, such prior art is disclosed in U.S. Pat. No. 6,338,906 (Ritland et al., 1999) and "Processing and microstructure of metal matrix composites prepared by pressureless Ti-activated infiltration using Fe-base and Ni-base alloys, Materials Science and Engineering A 393 (2005) 229-238", (Lemster et al). The first reference deals with seals produced by the capillary infiltration of porous (previously consolidated or sintered) ceramic particles by molten metal. The resulting microstructure of the component is thus comprised by thin channels surrounding ceramic particles. The resulting metal infiltrated ceramic is taught to have good tribological behavior and its use is exemplified in mechanical face seals, rotary unions, sliding gate seals, bushings, bearings and other sliding or rubbing components which require good durability and wear characteristics, good corrosion resistance and good thermal conductance. However, it is known that capillary infiltration requires thin channels and a balance of interfacial energies that drives the liquid metal into the channels, whereas in the reinforcement of wearing elements for ground-engagement of the present invention, molten cast steel is generally repelled by the ceramics materials of interest (i.e. molten steel does not readily wet these ceramics), inhibiting or precluding capillary action and requiring thicker channels to allow metal penetration. The second of the above-disclosed references also concerns processing of steel matrix composites with embedded ceramic particles. A specific issue under examination in this second reference is the enhancement of the infiltration characteristics of the ceramic by the use of titanium (Ti) grains mixed within the ceramic particles. This art thus allows the processing of metal matrix composites with a large content of ceramic. The microstructure resulting in the aforementioned prior arts involves a large fraction of ceramic grains infiltrated by metal and do not therefore cover consolidation of three-dimensional cellular metal matrix composites with a high metallic content as those proposed in the present invention. Moreover, presence of a large metallic fraction in the composite is not advantageous in the range of wear applications disclosed in the above discussed prior arts, where emphasis is placed in increasing the hardness of the material without counterbalancing for compressive strength and toughness. This equilibrium in mechanical properties is however highly desirable in the ground-engaging field of teeth for earth-moving applications, where both hardness and toughness govern in-service life and wear rate.

Further prior art disclosed in U.S. Pat. No. 4,909,300 (T. Horie, 1989) and EP1593757 (M. Freling et al., 2005) concerns processing of metal matrix composites by infiltration of low-cost ceramic foams. The first of the above-disclosed references deals with a method for producing a fluid-permeable part constituted by a porous ceramic structure with hollow ceramic members, whose pores are infiltrated by a cast metal, but maintaining the concatenation of the hollow (not infiltrated) members. In this way, the flow of a lubricating liquid is enabled to occur within the hollow ceramic members during service. Such in-service flow lacks utility in ground-engaging elements. The lack of penetration of the contiguously hollow ceramic members by the cast metal would, in fact, lead to a low fracture strength of the reinforced portion of the wearing element, and would therefore preclude its use in ground-engaging applications. The second reference discloses functionally graded foams infiltrated by molten metals, where the porosity of such foam has been engineered so that the resulting part exhibits a gradual variation in the relative metallic content from one side to the other. These graded-foam-infiltrated components are used in gas turbine engines for high temperature applications. The components exhibit tailored thermal conductivity because of the gradual variation of ceramic/metallic contents, but this property is neither necessary, nor useful for ground-engaging elements that require a combination of strength, toughness, and wear resistance.

None of the aforementioned prior-art documents describe nor consider a wear-resistant element such as a cast steel tooth for earth-moving applications, having a low-porosity secure bond between a reticulated cellular ceramic foam insert and cast steel that infiltrates the ceramic by gravity pouring.

SUMMARY OF THE INVENTION

The present invention relates to enhanced wear resistant elements for earth-moving, ground-engaging and/or rock-loading machinery, such as bucket teeth for excavators and loaders. The purpose of the invention is thus to improve the wear life of the wearing element by the inclusion of hard cellular ceramic foam inserts in-situ infiltrated by a tougher impact-resistant cast steel.

Therefore, the object of the present invention is a wearing element with a ceramic foam reinforcing insert as stated in claim 1.

The wearing element reinforced in this manner exhibits an outstanding combination of hardness, strength, toughness and wear resistance. After heat treatment by conventional methods of normalizing, quenching and tempering, the reinforced wearing element is well suited for applications wherein the pressure applied to the wearing surface of the wearing element does not exceed 1000 MPa.

The performance of the reinforced elements and specifically the avoidance of sudden in-service failures are critically influenced by the quality of the bonding that is developed between the ceramic foam and the cast steel. The quality of the bonding is directly determined by a good penetration of the cast steel within the cellular pores of the foam, within any voids or cracks in the cell walls and within the micro-porosity of the cell walls. The cell walls of the foam possess an extensive reticulated surface area that is contacted, surrounded, and penetrated by the cast steel such that robust mechanical interlocking occurs between the cast metal and the ceramic insert, thereby constituting a quality bond. The robust mechanical interlocking provides the wearing element with the combination of properties of the wear resistance and high hardness of the hard ceramic and the strength and toughness of the steel.

The reinforced wearing elements of this invention allow the extension of effective working time within consecutive replacements and hence may substitute conventional ground-engaging tools or elements such as loader and excavator bucket teeth, which are generally manufactured exclusively from low-alloy steels. Therefore, the invention refers to embodiments for reinforcing cast steel wearing elements whose use is intended in a wide spectrum of applications that essentially comprise those where the wearing element is subjected to abrasive wear solicitations in ground engagement, wherein the applied pressure in-service does not exceed a limit in the range of 1000 MPa compressive stress in the wearing portion of the element, or does not exceed a related critical value to such compressive stress limit as determined by, for instance, an analysis of Tresca, Von Mises, or maximum principal stress criteria for the on-set of fracture/plastic-flow.

DESCRIPTION OF THE DRAWINGS

The present disclosure includes the following figures to illustrate the invention.

DETAILED DESCRIPTION OF THE PREFERRED EMBODIMENTS

As previously stated, the object of the present invention is a reinforced wearing element for earth/rock engaging/moving machines comprising gravity-cast steel and at least one tridimensional reticulated cellular ceramic foam insert having an open-celled porous structure that is substantially or entirely penetrated by the cast steel. During the casting of said wearing element, cast steel infiltration of the ceramic foam occurs without using any external means to increase infiltration pressure. Such pressure-less infiltration is possible because the combination of the fluidic properties of the liquid steel at casting temperatures and the highly-open cellular structure of the ceramic foam is sufficient as to allow infiltration and penetration of the open cells of the foam, as well as infiltration and penetration within the cell walls of the ceramic foam.

Figure 1:
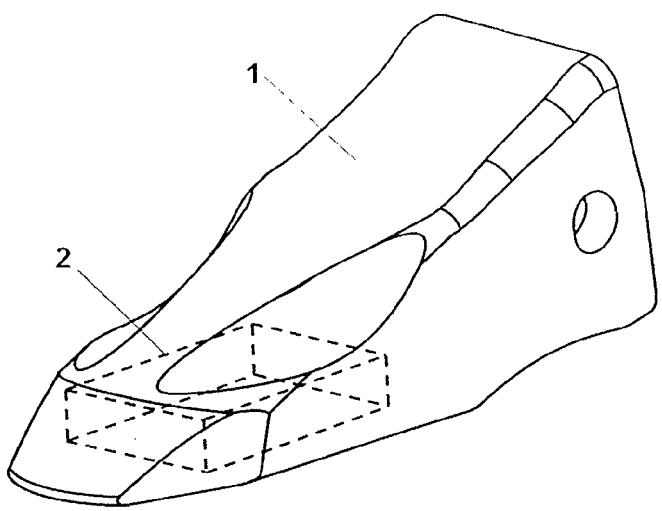
FIG. 1 is a tri-dimensional schematic drawing of a wear element of the invention with the insert therein.
Figure 2:
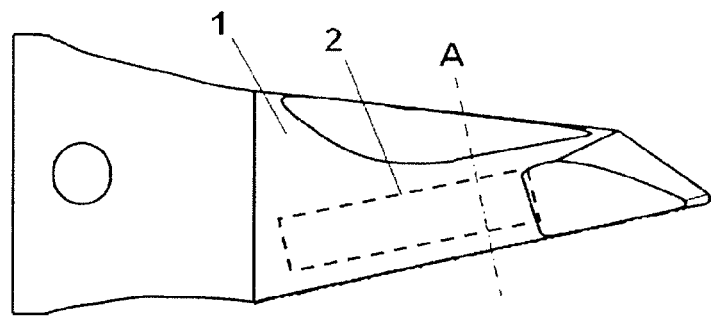
FIG. 2 is a side elevation schematic drawing indicating a sectional plane (A) of a wear element of the invention with the insert therein.
Figure 3:
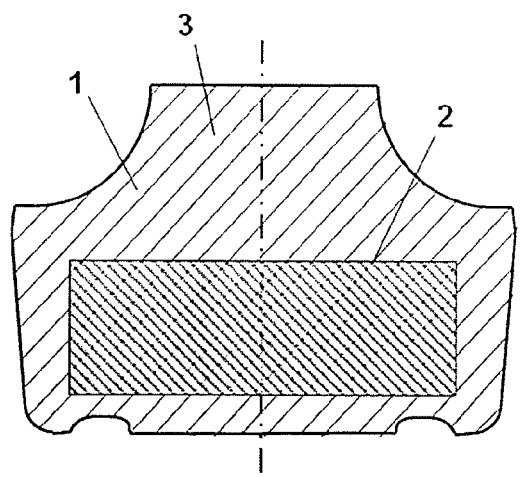
FIG. 3 is a schematic drawing of a sectional plane (A) of a wear element of the invention with the insert therein.

Referring to FIG. 1, a reinforced ground-engaging element of the invention, as exemplified by a tooth (1), is shown to include a steel/cellular foam composite region (2). In FIG. 2 a side-elevation view of tooth (1) is illustrated and identifies a sectioning plane (A), which is orthogonal to the viewing direction and passes through the tooth (1) and through composite region (2). FIG. 3 illustrates a sectional view of the tooth (1) in accordance with the sectional plane (A) that shows composite region (2) as surrounded by cast steel (3).

The reinforced wearing element of the invention, such as an excavator or loader tooth (1), includes a steel/cellular foam composite region (2). Although composite region (2) may have a simple rectangular box-shape within the tip portion of the tooth (1), it will be evident to one skilled in the art that other shapes and locations of composite region (2) can be adopted as suiting the expected in-service erosion development and wear pattern of the wearing element. Although composite region (2) may occupy only a certain portion of tooth (1), it is generally desirable that the size of composite region (2) be sufficiently extensive as to provide maximum wear resistance to the tooth (1) while minimizing the cost of the ceramic foam insert and the complexity of the cast-moulding arrangement.

In particular, the insert included in the wearing element is a three-dimensional reticulated cellular ceramic foam with an open-celled porous structure that is substantially or completely penetrated by molten steel during gravity-casting of the element. The material of said insert is preferably a zirconia-based ceramic, such as, for example, zirconia-yttria, ($ZrO_2$—$Y_2O_3$), zirconia-magnesia ($ZrO_2$—$MgO$), zirconia-calcia ($ZrO_2$—$CaO$), or also a zirconia-alumina ($ZrO_2$—$Al_2O_3$) composite.

The ceramic insert can otherwise be comprised by alumina-silicates ($Al_2O_3$—$SiO_2$) such as mullite, or high alumina ($Al_2O_3$) materials such as, for example, white or tabular alumina, or aluminate materials such as, for example, aluminate spinel or zirconia-toughened alumina, or even ceramic carbides, such as silicon carbide (SiC). From the aforementioned materials, high alumina, aluminate and silicon carbide ceramics exhibit the highest hardness and may be thus expected to provide the highest wear resistance when properly infiltrated and bonded to a softer but tougher steel. However, it is well known that the wettability of alumina-based ceramics by liquid steel is comparatively and significantly poorer than that of the zirconia-based ceramics and it is also well known that silicon carbide can be easily dissolved by molten steel. In this context, it has been recognized that coating of high alumina, aluminate and silicon carbide ceramic foams with a ceramic material of better wettability by molten steel, such as an alumina-silicate material, for example mullite, or a zirconia-based material, facilitates infiltration and bonding. The so-coated ceramic foam can be formed by the immersion of poorly wettable ceramic foams into a slurry of the coating material followed by its firing.

In particular, the cast steel is constituted by a low alloy steel that is readily hardened by normalizing, quenching and tempering heat treatment, having chemical analysis by weight percent; carbon content between 0.15% and 0.35%, silicon content between 0.5% and 2%, manganese content between 0.5% and 1.5%, chromium content between 0.5% and 2.5%, nickel content between 0% and 2%, molybdenum content between 0.15% and 0.35%, as well as small contents of aluminum and zirconium additions for deoxidation and residual levels of sulphur and phosphorus and other minor impurities or constituents. The silicon content of the cast steel is most influential in providing the liquid steel with fluidic properties at casting temperature that obtain the desired penetration of the ceramic foam inserts. In the context of obtaining a quality bonding between the cast steel and the ceramic foam insert, the preferred fluidic properties of the molten steel are obtained in steels having silicon contents greater than 1% by weight.

Figure 4:
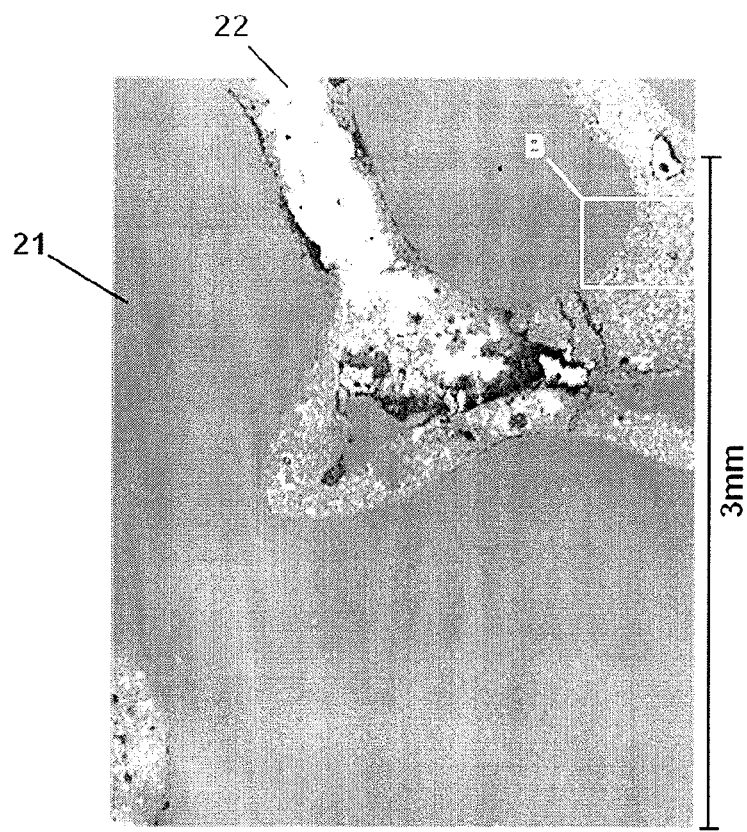
FIG. 4 is a micrograph showing the structure of a steel/ceramic foam composite region (2) of a wear element of the invention.

FIG. 4 is a micrograph of a polished sectional area within the steel/ceramic foam composite region (2) of an element of the invention. Infiltrated cast steel (21) of the aforementioned composition constitutes the dark features of the micrograph, while the lighter features comprise the walls of the ceramic foam (22), which in this instance is a zirconia-based ceramic material. The portion of the micrograph that shows a fine mixture of light and dark features is a portion where the infiltrated cast metal (21) has penetrated within the cell walls of the ceramic foam (22). Also identified in FIG. 4 is a certain area (B) of the photomicrograph that includes a portion of fine penetration of the ceramic walls (22) by the infiltrated steel (21).

Figure 5:
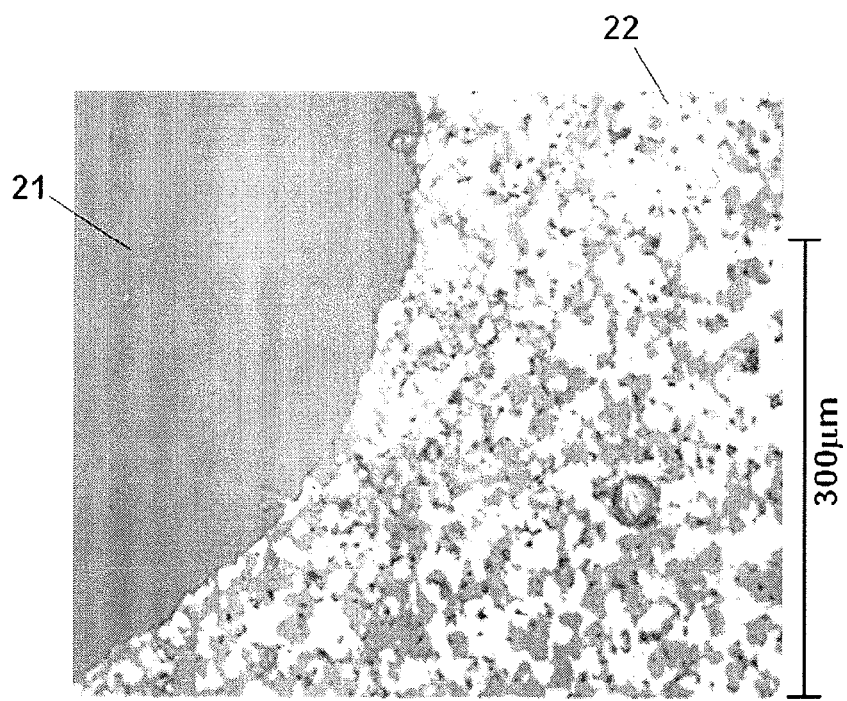
FIG. 5 is a high magnification micrograph of an area (B) within a steel/ceramic foam composite region (2) of a wear element of the invention.

FIG. 5 is a high magnification micrograph of the certain area (B) in which there is a portion of fine penetration of the micro-porosity of the ceramic walls (22) by the infiltrated steel (21). Again in this micrograph, the dark features are the infiltrated steel (21) and the light features comprise the walls of the ceramic foam (22). The dark portion toward the left-hand part of the micrograph is infiltrated steel (21) that is within what was once an open cell of the foam prior to infiltration, while the mottled portion toward the right-hand side of the micrograph is a fine intermix of light and dark features indicating fine penetration of the micro-porosity of the cell walls (22) by the infiltrated steel (21).

FIG. 4 and FIG. 5 evidence the excellent interlocking of infiltrated steel (21) and the walls of the ceramic foam (22) that provides the quality bonding achieved within the steel/ceramic foam composite region (2) of an element of the invention.

Infiltration tests performed using the aforementioned ceramic foams and cast steel have proven that it is possible to properly penetrate foams of average cellular porosity between 10 and 60 pores per inch (i.e. 10 to 60 ppi), and preferably 20 to 30 ppi. In doing so, the enhanced wear properties of the resulting steel/ceramic foam composite (2) are assured by its fine macro- and microstructure. To further enhance the wear-impact properties of the resulting cast-steel-infiltrated foam composite portion (2) of the wearing element, it is also suitable that the volume fraction of the ceramic phase exceeds 10% but does not exceed 35% of the composite region (2) of the element.

A particular feature in the present invention is that the steel infiltration of the ceramic foam insert, forming composite region (2), occurs both in the relatively large cells at macroscopic scale as well as in the cell walls at a micro-structural scale, so as to provide strong mechanical interlocking between the ceramic and the cast steel. The thusly-produced good bonding between metal and ceramic has been evidenced through uniaxial compressive testing of the steel-infiltrated foams (i.e., composite region (2)) after normalizing, quenching and tempering heat-treatment of the wearing element. The results show a rather elastic response to uniaxial stress levels up to the range of 700 MPa to 1000 MPa as determined with a strain offset of 0.01%. At stresses exceeding 1000 MPa, inelastic deformation processes and decohesion between steel and ceramic cell walls can occur. Using the same testing method, the elastic limit of the un-infiltrated cast steel (3) after normalizing, quenching and tempering heat-treatment of the wearing element has been determined to be in the range of 1400 to 1500 MPa. However, a minimum elastic limit of 700 MPa provides a wide range of utility of the reinforced elements in ground-engaging applications, involving applied pressures as high as 1000 MPa, that include highly wear-resistant teeth for general purpose loaders and excavators.

Figure 6:
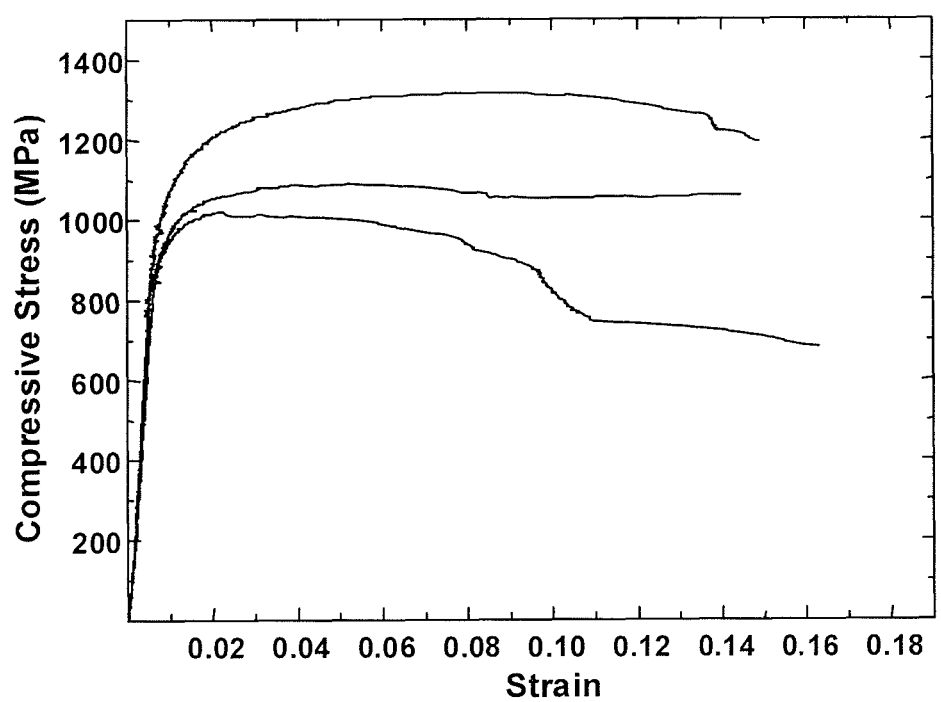
FIG. 6 is a graphic plot of uniaxial compression test results, showing stress as related to strain for three samples obtained from steel/ceramic foam composite region (2) of a wearing element of the invention.

The above results can be observed in FIG. 6, where a graphical plotting of compressive stress as related to compressive strain for three typical samples obtained from steel/ceramic foam composite region (2) of a normalized, quenched and tempered heat-treated wearing element of the invention is shown. As it can be seen in FIG. 6, the compressive stress response of composite region (2) exhibits a rather elastic behavior (i.e. a nearly straight-line relationship between stress and strain) from the zero stress level up to uniaxial compressive stress levels in the range of 700 MPa to 1000 MPa. At stresses exceeding approximately 1000 MPa, plastic (i.e., inelastic or permanent) deformation of the steel occurs in conjunction with decohesion between the steel and the ceramic cell walls.

A further embodiment of the invention consists of a hybrid insert, i.e. a first ceramic foam insert as described before with a second insert that is introduced in said first insert so that said first insert is at least partially surrounding said second insert. Said second insert is preferably comprised by a cermet, most preferably made of cemented tungsten carbide, which is introduced inside a ceramic foam insert of the types described previously. A cermet insert provides an additional increase of wear resistance as compared to wearing elements reinforced only with the steel/ceramic composite region (2).

The nature and object of the invention will be made apparent by the following detailed description of one preferred embodiment of the invention.

The object of this embodiment is, as previously stated, a wearing element, i.e. a cast steel tooth, to be specially used in loading applications. The main purpose of the wearing element is the loading of loose mineral/stones into trucks, dumpers or any other transportation means in mining-sites, quarries or the like.

The loading tooth of the present embodiment comprises a zirconia-based ceramic foam insert to improve the wear resistance of the tooth thus prolonging its service life. The reliability of the reinforced tooth is assured by obtaining quality bonding between the reinforcing ceramic foam insert and the cast steel constituting the tooth. Complete penetration of the cast steel within the cellular pores of the foam and within the microporosity of the cell walls has been achieved.

The insert of the present embodiment is a sintered zirconia-based ceramic foam of 130 mm in length by 90 mm in width by 25 mm in height. The ceramic foam has been obtained by impregnating an open-celled polymeric foam with a slurry of the zirconia-based material and by subsequent firing. The so obtained ceramic foam is characterized by having an open cellular macroporosity of 20 ppi. The ceramic walls were microporous and contained some voids and cracks.

The cast steel used to produce the wearing element of the present embodiment had a composition that comprised, by weight percent; 0.27% carbon, 1.5% silicon, 0.9% manganese; 2.1% chromium and 0.3% molybdenum.

The wear element has been produced using no-bake resin-bonded silica-based sand moulding, commonly referred to as the ISOCURE Process. The mould was not preheated and had a ratio of sand to steel of 1.6 kg sand/kg of cast steel.

The weight of steel poured in the mould to constitute the wearing element and to infiltrate the ceramic foam insert was 20.3 kg. Steel pouring temperatures in the range of 1550-1650° C. were employed. These temperatures represent a superheating 50 to 150° C. above the melting temperature of the low-alloy cast steel used to constitute the wearing element. In all cases, integrity of the ceramic foam has been preserved (i.e. no breaking due to thermal shock) and desired infiltration of the foam (macro- and micro-infiltration) has been achieved.

The wearing elements were heat treated by a typical normalizing, quenching and low-temperature tempering practice, so as to obtain in the cast steel of the wearing element a microstructure consisting of mainly hard and tough tempered martensite.

The reinforced wearing elements of this embodiment exhibited in-service an approximate 50% increase in life/duration as compared to unreinforced wearing elements of the same geometry, similar steel composition and similar heat-treatment.

The invention claimed is:

1. A wearing element for at least one of earth/rock moving, ground-engaging or rock-loading machines, comprising cast steel and at least one insert that is a cellular tridimensional ceramic foam having an open-celled porous structure that is penetrated by the cast steel within the open-celled porosity of the ceramic foam insert, as well as within the microporosity of the ceramic foam walls.

2. The wearing element according to claim 1, wherein said insert is made from zirconia ($ZrO_2$) or a zirconia-based material.

3. The wearing element according to claim 1, wherein said insert is made from high alumina material or from aluminate material, or from alumina-silicate ($Al_2O_3$—$SiO_2$) material.

4. The wearing element according to claim 1, wherein said insert is made from coated high alumina ($Al_2O_3$) material, or coated aluminate material, or coated carbide material, wherein the coating is formed from alumina-silicate material or zirconia-based material.

5. The wearing element according to claim 1, wherein the average cellular porosity of said insert is between 10 and 60 pores per inch (ppi).

6. The wearing element according to claim 1, wherein the average cellular porosity is between 20 to 30 ppi.

7. The wearing element according to claim 1, wherein the volume percentage of ceramic of said cellular foam insert is greater than 10% and less than 35%, with the greatest majority of the remaining volume of the insert being infiltrated by the cast steel.

8. The wearing element according to claim 1, wherein said cast steel has a composition comprising by weight percent, carbon between 0.15% and 0.35%, silicon between 0.5% and 2%, manganese between 0.5% and 1.5%; chromium between 0.5% and 2.5%, nickel between 0% to 2% and molybdenum between 0.15% and 0.35%.

9. The wearing element according to claim 1, wherein said cast steel has silicon content by weight percent greater than 1%.

10. The wearing element according to claim 1, wherein element is heat-treated by normalizing, quenching and tempering.

11. The wearing earing element according to claim 1, wherein the cellular tridimensional ceramic foam having an open-celled porous structure that is penetrated by the cast steel is a steel/ceramic foam composite region (2) formed within said element that has uniaxial compressive elastic stress limit greater than 700 MPa.

12. The wearing element according to claim 1, wherein said at least one insert is a first insert and further comprising the incorporation of at least one second insert within, or at least partially surrounded by, said first insert.

13. The wearing element according to claim 12, wherein said second insert is a tungsten carbide cermet.

14. The wearing element according to claim 1, wherein said wearing element is a tooth for loader or excavator machines.

15. The wearing element according to claim 1, wherein the applied pressures on the wearing surface of the wearing element in-service do not exceed 1000 MPa.

16. The wearing element according to claim 2, wherein said insert is made from $ZrO_2$—$CaO$, $ZrO_2$—$MgO$, $ZrO_2$—$Y_2O_3$ or $ZrO_2$—$Al_2O_3$.

17. The wearing element according to claim 3, wherein said insert is made from white or tabular alumina, or from alumina spinel or zirconia-toughened alumina, or from mullite.

18. The wearing element according to claim 4, wherein said insert is made from alumina spinel or zirconia-toughened alumina material or silicon carbide.

19. A wearing element for at least one of earth/rock moving, ground-engaging or rock-loading machines, comprising cast steel and at least one insert in the case steel that is a cellular tridimensional ceramic foam having an open-celled porous structure that is penetrated by the cast steel within the open-celled porosity of the ceramic foam insert, as well as within the microporosity of the ceramic foam walls; said cast steel extending from an outer surface of the wearing element and penetrated into the open-celled porous structure by gravity casting pressure-less infiltration.

20. The wearing element according to claim 19, wherein said cast steel has a composition comprising by weight percent of silicon of 1% or more.

* * * * *